Figure 1:
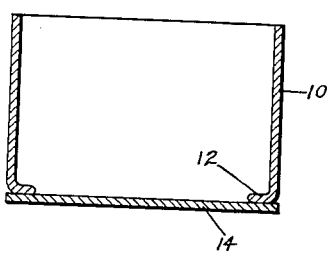

June 19, 1956

D. W. CARLSON 2,751,319

METHOD OF MAKING DRUM LINERS

Filed Aug. 12, 1952

Inventor
Donald W. Carlson
By Harry H. Levin
Attorney

United States Patent Office 2,751,319
Patented June 19, 1956

2,751,319
METHOD OF MAKING DRUM LINERS

Donald W. Carlson, Terre Haute, Ind., assignor to The Visking Corporation, Chicago, Ill., a corporation of Virginia Application August 12, 1952, Serial No. 303,980

6 Claims. (Cl. 154—83)

This invention relates to drum liners. More particularly, it relates to flat bottom cylindrical drum liners and the method of making the same.

U. S. Patent No. 2,461,975 discloses the production of seamless lay-flat tubing of various thermoplastic materials, including polyethylene. Because of the properties of polyethylene, such tubing has been extensively used as a liner for drums in which various commodities may be packed. For such use, polyethylene tubing of appropriate length and with one end thereof sealed to form a bag was employed. The bag was inserted by hand simply by opening and pushing it with the sealed end leading into the drum. For greater neatness, the bag was first pulled over a mandrel or on a cylinder open at both ends and the assembly placed in the drum with the portion of the bag extending beyond the top of the drum pulled down onto the outside of the drum, following which the mandrel was withdrawn and the drum filled.

In either case, after filling the liner was gathered together adjacent the open end and pressed as closely as possible to the top of the contents to expel entrapped air, and then by twisting from down to up there was formed a neck which was appropriately tied. After tying, the portion of the neck extending above the tie was untwisted and flattened against the contents.

When a bag of the type previously described constituted the liner, the bottom of the liner was formed by spreading the bag outwardly from the seam by the pressure of the contents. Due to the construction of the bags, the portions thereof adjacent the seam flattened out in a horizontal plane and portions adjacent the ends of the seam formed projecting ears which frequently prevented the bottom of the liner from becoming coextensive with the bottom of the drum or formed undesirable folds.

An object of this invention is to provide a new and improved drum liner and method of preparing the same.

Another object of this invention is to provide a drum liner having a flat bottom and method of making the same.

Other and additional objects will become apparent hereinafter.

The objects of the invention are accomplished, in general, by circumferentially expanding a cylindrical tubing formed of a flexible, stretchable material at a spaced distance from one end thereof until the thus provided marginal portion folds inwardly to form an inwardly extending flange to which a flat sheet is appropriately secured.

In one embodiment of the invention, a circumferentially expansible mandrel, inserted in the tubing and spaced from the end a distance approximately equal to the length of the desired flange, is gradually expanded, whereupon the portion of the tubing engaged by the mandrel is stretched circumferentially and the free marginal portion will fold inwardly and form the flange disposed on the upper face of the mandrel. A sheet of material which is to constitute the flat bottom is then appropriately secured to the flange. Thereafter, the drum is contracted and the drum liner removed therefrom. Either prior to or subsequent to the removal of the mandrel, the bottom may be trimmed to appropriate circular form and/or to remove excess material.

The upper surface of the mandrel is provided with means permitting the performance of the sealing operation. In those embodiments of the invention wherein a mandrel formed of a plurality of segments is employed, there is also provided means bridging the spaces between adjacent segments when in the expanded position to provide a continuous support for the flange and assure the production of a continuous seal. Means are also provided to aid and facilitate the contraction of the mandrel to unexpanded position upon release of the expanding force.

Figure 2:
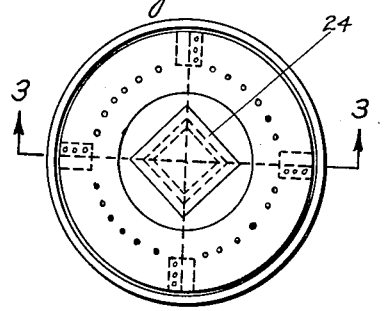
Figure 3:
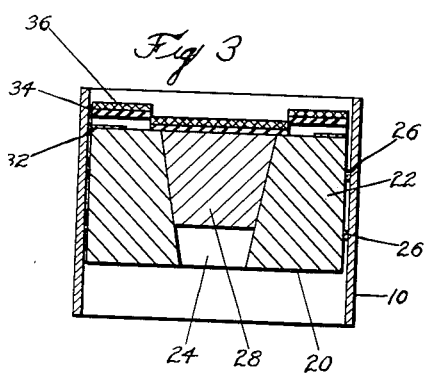
Figure 4:
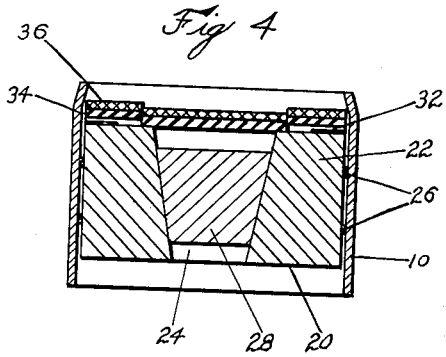
Figure 5:
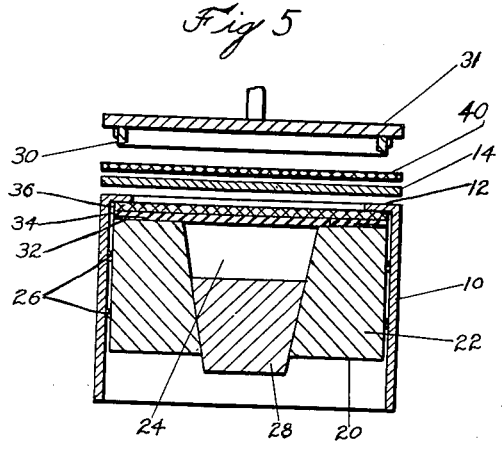

The nature of the invention and the manner in which it may be practiced will become clear from the following detailed description when taken in conjunction with the accompanying drawings, and wherein, Figure 1 is a section of a drum liner embodying the principles of the invention, Figure 2 is a top view diagrammatically illustrating the position of the unexpanded expansible mandrel and the tubing at the beginning of the process of this invention, Figure 3 is a section taken along lines 3—3 of Figure 2, Figure 4 is a section diagrammatically illustrating the tubing with the mandrel in partly expanded position, and Figure 5 is a section diagrammatically illustrating the tubing with the mandrel in fully expanded position just prior to securing the flat bottom to the tubing and the sealing head.

Now referring to the drawings wherein like reference numerals designate like parts, the reference numeral 10 discloses a cylindrical tubular body member having one of its ends infolded to provide an inwardly extending flange 12 to which a flat circular sheet material 14 is appropriately secured. Due to the construction the bottom of the drum liner will lie flat on the bottom of the drum without forming any folds or projecting ears. Manifestly, the drum liner can be made of any diameter and height and, in general, the dimensions thereof will conform to the drum in which it is to be used.

In the preferred embodiment of the invention, the body member 10 and the flat bottom 14 of the drum liner are each formed of unsupported polyethylene film. However, the invention is not restricted to drum liners formed of such material. Any material which can be stretched (drawn), for the reasons which will become apparent hereinafter, can be used. In general, any unsupported thermoplastic flexible film exhibiting stretch characteristics can be used. Likewise, other flexible materials exhibiting stretch characteristics can also be used. Film formed of nylon (extrusion or molding), Saran, copolymers of vinyl chloride and vinyl acetates, polyvinyl chloride, rubber hydrochloride, polymeric trifluorochloroethylene, ethyl cellulose, cellulose acetate, moistureproof heat-sealing cellophane, etc., are additional illustrative examples of film materials capable of use in this invention. The thickness of the selected flexible film may be from about 2 to 6 mils. Satisfactory results have been obtained with film 4 mils thick.

As indicated, the body member 10 and the flat bottom 14 are preferably formed of the same film, but if desired, they can be of different film. The body member 10 may be seamless or seamed, as desired. When a seamless body member is desired, the tubing used therefor may be produced by the method disclosed in U. S. Patent No. 2,461,975, or any other method. When the body member consists of a seamed tubing, such tubing can be obtained by appropriately overlapping the opposite marginal portions of a sheet material and appropriately securing, as by heat sealing, the resulting overlapped portions.

In the preferred embodiment of the invention, bottom 14 is secured to flange 12 by heat sealing, i. e., impulse sealer, radio frequency sealer, and heated bar sealers. When flange 12 and bottom 14 are formed of a solvent sealable material, they can be secured together through the use of an appropriate solvent. Likewise, the seal may be made through the use of appropriate adhesives or cements.

To produce the drum liner, a circumferentially expansible mandrel 20 is inserted and positioned in the selected tubing so that the top of the mandrel is spaced a predetermined distance from the top edge of the tubing as shown in Figure 3. In one embodiment of the invention, the expansible mandrel 20 comprises a wooden drum composed of four segments 22 and provided with a tapered square hole 24 in the center thereof for reasons which will become apparent hereinafter. The segments are held together in unexpanded (closed) position by means of elastic bands 26 on the peripheral wall of the mandrel which continually urge the segments inwardly. On the form shown, two bands 26, one adjacent the top and the other adjacent the bottom of the mandrel, are used. Due to the elasticity of the bands, the mandrel can be expanded as hereafter described, and when the force for producing the expansion is released, the elastic bands will urge the segments inwardly to contact the mandrel to unexpanded position.

To expand the mandrel 20, a square tapered peg 28 is inserted in the tapered hole 24 of the mandrel 20 and forced downwardly gradually. As the mandrel expands, the portion of the tubing wall engaged by the peripheral wall of the expansible mandrel will be stretched gradually and the marginal portion will gradually fold inwardly. The expansion of the mandrel is continued until the wall of the tubing in contact therewith has been expanded to such an extent that the marginal portion will be folded inwardly through 90° to constitute the inwardly extending flange 12 disposed on the top face of the mandrel. Figure 4 diagrammatically illustrates a stage of the infolding of the marginal portion of the tube and Figure 5 diagrammatically shows the flange 12 at the end of the operation.

After the inwardly extending flange 12 has been produced and while disposed on the mandrel as previously described, a flat film which is to constitute the bottom 14 and of a diameter approximately the same as the original diameter of the tubing is secured by heat sealing to the flange 12. In the form shown in Figure 5, the heat sealing is obtained by a circular heat sealing ring 30 carried on a reciprocal plate 31.

To permit the aforementioned sealing operation to be performed, there is provided a shim stop support 32 which covers the joint formed by and overlaps the abutting ends of two adjacent drum segments when in closed position. Each shim 32 is appropriately secured to one of the drum segments with which it cooperates so that circumferential expansion of the mandrel will be permitted and a continuous support will be provided during the heat sealing operation. The width of each shim is sufficient to bridge the space between the adjacent segments it overlaps when the mandrel is in maximum expanded position. An annular member formed of a resilient material such as, for example, 40 durometer rubber, is appropriately secured on the top face of the drum to provide a resilient sealing base 34 and to compensate for any misalignment or uneven pressure. In general, the width of the sealing base 34 is greater than that of the flange 12 to which the bottom 14 is to be secured. To prevent adhesion between the flange 12 and the sealing base 34, the latter is provided with a coextensive surface covering 36 consisting of glass fiber cloth impregnated with tetrafluoroethylene. The covering 36 is appropriately secured in position. In the form shown, both the sealing base 34 and its covering 36 are tacked to the upper surface of the mandrel.

The circumference of both the sealing base 34 and the impregnated glass fiber are the same as that obtained upon maximum expansion of the mandrel which, of course, depends on the diameter of the tubing which is to constitute the body member of the drum liner. Thus, in closed and unexpanded position, the rubber base 34 and impregnated glass fabric 36 may buckle or bulge when the mandrel is in closed position.

After the bottom 14 has been heat sealed to the flange 12, peg 28 is forced upwardly. As the expanding force is released, the elastic bands 26 continually urging the segments inwardly will contract the mandrel to a size, or indeed to original unexpanded size, permitting easy separation thereof from the tubular wall.

In general, the diameter of the expansible mandrel, in closed position, is smaller than that of the tubing in which it is inserted, and the length of the expansible mandrel is at least six inches irrespective of the length of the tubing, which may be several times its diameter.

The width of the flange 12 to which the bottom 14 is secured may vary within limits. Satisfactory results have been obtained when the width of the flange is of the order from ¼" to ¾" or more. The desired width of the flange is obtained by locating the top of the mandrel inserted in the tubing a distance below the edge of tubing equal to and preferably greater than the desired width of the flange.

The following example will illustrate one embodiment of the invention: A segmented wooden drum (of the type previously described), approximately 12⅝" overall diameter in closed position and 6" high, was inserted in a 20" lay-flat width seamless tube formed of polyethylene of 4 mil thickness, the top of a mandrel being positioned approximately ⅝" below the end of the tubing and the drum was expanded to 13¾" overall diameter, whereupon an inwardly extending flange of approximately ⅝" was formed. A flat sheet consisting of unsupported polyethylene film 4 mil thick and at least 14" square was then disposed on the flange and the circular heat sealing head brought in pressure contact with the film for a duration of approximately one second at approximately 330° F., the pressure exerted on the film by this sealing head being equivalent to approximately 50 pounds per square inch on the sealing surface. Preferably, a protective covering 40 consisting of glass fiber cloth impregnated with tetrafluoroethylene is interposed between the sealing head and the flat polyethylene sheet to prevent adhesion to each other during the sealing operation. After the sealing operation, the peg was urged upwardly in order that the mandrel would be contracted as hereinbefore described and the mandrel removed. The dimensions of the peg are such that contraction of the mandrel sufficient to permit removal of the drum liner from the mandrel is obtained when the top surface of the peg is in spaced relationship to the inner surface of the bottom 14. Finally, the bottom is appropriately trimmed to conform with the diameter of the liner. If desired, the trimming operation may be performed before the removal of the mandrel, or a circular sheet of the appropriate dimensions to constitute the bottom may be utilized, in which case no trimming is necessary.

Upon removal of the drum liner from the expansible mandrel, it will be noticed that the diameter of the tubular body member adjacent the seal shows a tendency to be of greater diameter than the normal diameter of the tubing. However, in general, the films of the type hereinbefore described, and particularly polyethylene, exhibit creep with the result that the tubular body member will eventually return to approximately its original size.

Though hereinbefore the mandrel is described as being expanded by means of a tapered peg cooperating with a corresponding spaced central hole in the mandrel, it is to be understood that the invention is not restricted thereto. Many other ways of expanding the mandrel may be utilized. For example, the segments of the mandrel may be connected through appropriate toggle linkages which, upon movement in one direction, will expand the mandrel and movement in the opposite direction will cause it to collapse. Likewise, the expansion and contraction of the mandrel may be obtained by hydraulic means, such as by appropriately connecting each segment to a piston in an air cylinder operated through a common valve.

The invention provides a strong, rugged flat bottom drum liner which can be positioned in a drum very easily. When in position in the drum, the bottom of the drum liner will lie flat on the bottom of the drum and the load of the contents will be equally distributed thereover.

Since it is obvious that various changes and modifications may be made in the above description without departing from the nature or spirit thereof, this invention is not restricted thereto except as set forth in the appended claims.

I claim:

1. A method of preparing flat bottom cylindrical drum liners which comprises applying a radially expansive force interiorly of a cylindrical tubing formed of a flexible stretchable material at a spaced distance from one end thereof until the marginal end portion of said tubing immediately beyond the stretching zone folds inwardly and forms an inwardly extending flange and securing a flat sheet to the outer surface of said flange to provide the flat bottom of said liner.

2. A method as set forth in claim 1 wherein the tubing and flat sheet are formed of plastic film and secured together by heat-sealing.

3. A method as set forth in claim 1 wherein the tubing and flat sheet are formed of polyethylene film and secured together by heat-sealing.

4. A method of preparing flat bottom cylindrical drum liners which comprises disposing a circumferentially expansible mandrel in a cylindrical tubing formed of a flexible stretchable material at a spaced distance from the end of said tubing to provide a marginal end portion extending beyond said mandrel, circumferentially expanding the mandrel and stretching the portion of tubing in engagement therewith until said marginal portion folds inwardly and forms an inwardly extending flange, securing a flat sheet to the outer surface of said flange to provide the flat bottom of said liner, contracting said mandrel sufficiently to permit removal of the flat bottom drum liner therefrom and removing the flat bottom cylindrical drum liner from said mandrel.

5. A method as set forth in claim 4 wherein the tubing and flat sheet are formed of plastic film and the flat sheet is secured to the flange by heat sealing.

6. A method as set forth in claim 4 wherein the tubing and flat sheet are formed of polyethylene film and the sheet is secured to the flange by heat sealing.

References Cited in the file of this patent

UNITED STATES PATENTS

| | | |
|---|---|---|
| 893,654 | Remus | July 21, 1908 |
| 1,181,506 | Cunningham | May 2, 1916 |
| 2,120,899 | Moore | June 14, 1938 |
| 2,209,570 | Kraft | July 30, 1940 |
| 2,318,952 | Martin | May 11, 1943 |
| 2,385,506 | Gurwick | Sept. 25, 1945 |
| 2,478,267 | Hickler | Aug. 9, 1949 |
| 2,511,481 | Schneider | June 13, 1950 |
| 2,546,208 | Barton | Mar. 27, 1951 |
| 2,564,695 | Johnson et al. | Aug. 21, 1951 |

FOREIGN PATENTS

| | | |
|---|---|---|
| 560,349 | France | July 7, 1923 |
| 579,137 | Great Britain | July 24, 1946 |
| 652,054 | Great Britain | Apr. 18, 1951 |